United States Patent
Ketcham et al.

[11] Patent Number: 5,368,275
[45] Date of Patent: Nov. 29, 1994

[54] FLUID LINE ADAPTER

[75] Inventors: Mark G. Ketcham, East China; James McNaughton, Rochester; Robert J. Zielinski, Sterling Heights, all of Mich.

[73] Assignee: Bundy Corporation, Warren, Mich.

[21] Appl. No.: 91,863

[22] Filed: Jul. 15, 1993

Related U.S. Application Data

[63] Continuation-in-part of Ser. No. 834,030, Feb. 11, 1992.

[51] Int. Cl.⁵ .............................................. F16L 37/00
[52] U.S. Cl. .............................. 251/149.6; 251/149.1; 285/319
[58] Field of Search .................... 251/149.1, 149.6; 285/319, 921; 137/519.5

[56] References Cited

U.S. PATENT DOCUMENTS

| | | | |
|---|---|---|---|
| 3,538,950 | 11/1970 | Porteners | 251/149.6 X |
| 3,770,001 | 11/1973 | Davis | 137/519.5 X |
| 4,208,034 | 6/1980 | Ohlsson | 251/149.1 |
| 4,370,000 | 3/1982 | Lange et al. | |
| 4,543,114 | 9/1985 | Beattie et al. | |
| 4,637,881 | 1/1987 | Sciuto | |
| 4,733,890 | 3/1988 | Vyse | |
| 4,819,908 | 4/1989 | Norkey | 251/149.6 |
| 4,846,506 | 7/1989 | Bocson et al. | |
| 4,875,709 | 10/1989 | Caroll et al. | |
| 4,902,043 | 2/1990 | Zillig et al. | |
| 4,908,132 | 3/1990 | Koval et al. | |
| 5,024,761 | 6/1991 | Deibel | |
| 5,056,756 | 10/1991 | Norkey et al. | 251/149.6 |
| 5,069,424 | 12/1991 | Dennany, Jr. et al. | 251/149.1 X |
| 5,116,499 | 5/1992 | Deibel | |
| 5,118,317 | 6/1992 | Deibel | |

FOREIGN PATENT DOCUMENTS

| | | |
|---|---|---|
| 1143840 | 4/1957 | France . |
| 841818 | 7/1960 | United Kingdom . |

*Primary Examiner*—Martin P. Schwadron
*Assistant Examiner*—Kevin L. Lee
*Attorney, Agent, or Firm*—Dorn, McEachran, Jambor & Keating

[57] ABSTRACT

An adapter is insertable into an existing fluid line system at a quick connector coupling joint. The adapter has a male section, which is configured to connect to the female connector body of the quick connector coupling, and a female section, which is configured to receive the male member of the existing quick connector coupling. A middle section disposed between the male and female members houses functional elements desired to be added to the fluid line. One such element is a check valve which allows flow in only one direction through the fluid line.

27 Claims, 3 Drawing Sheets

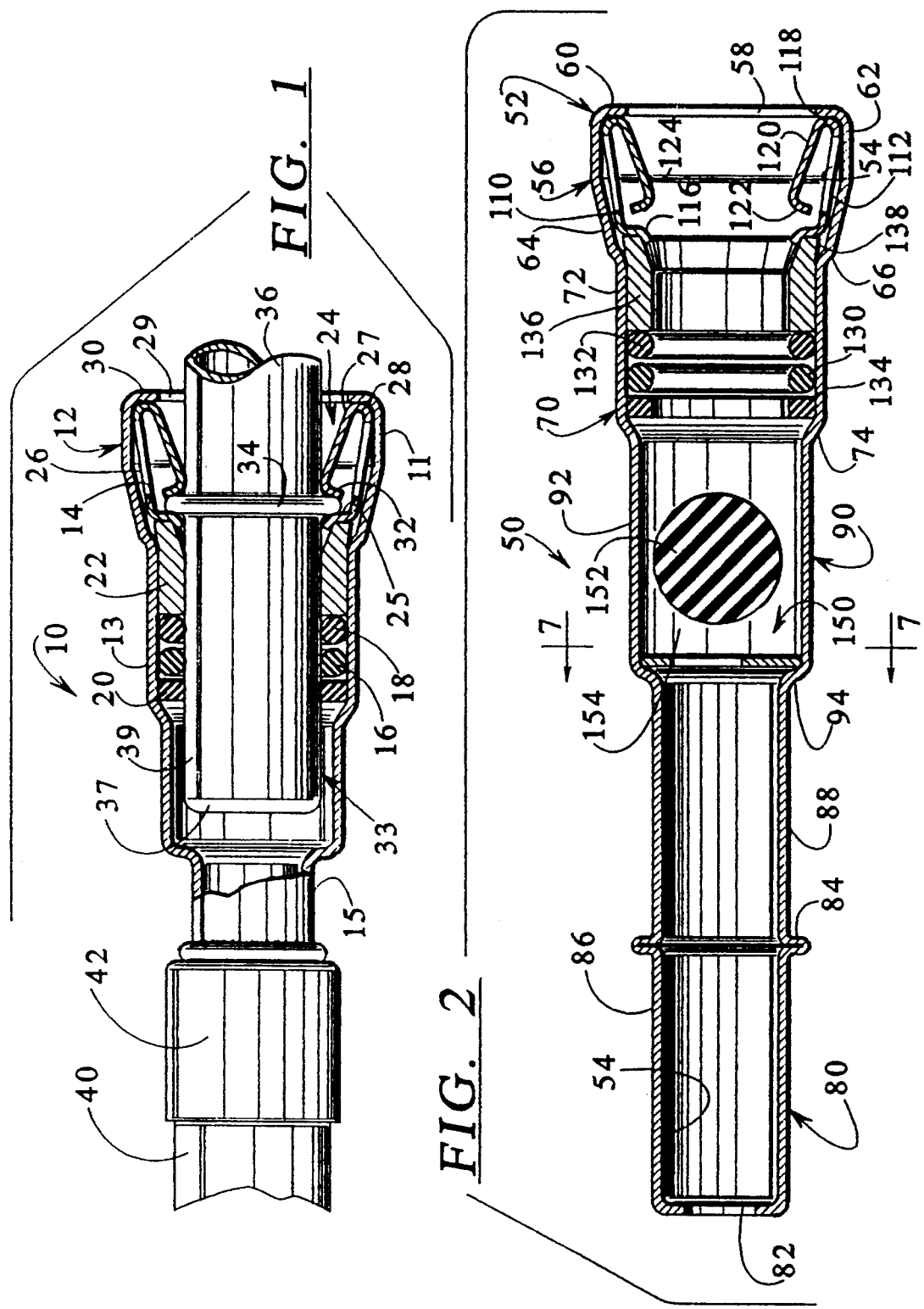

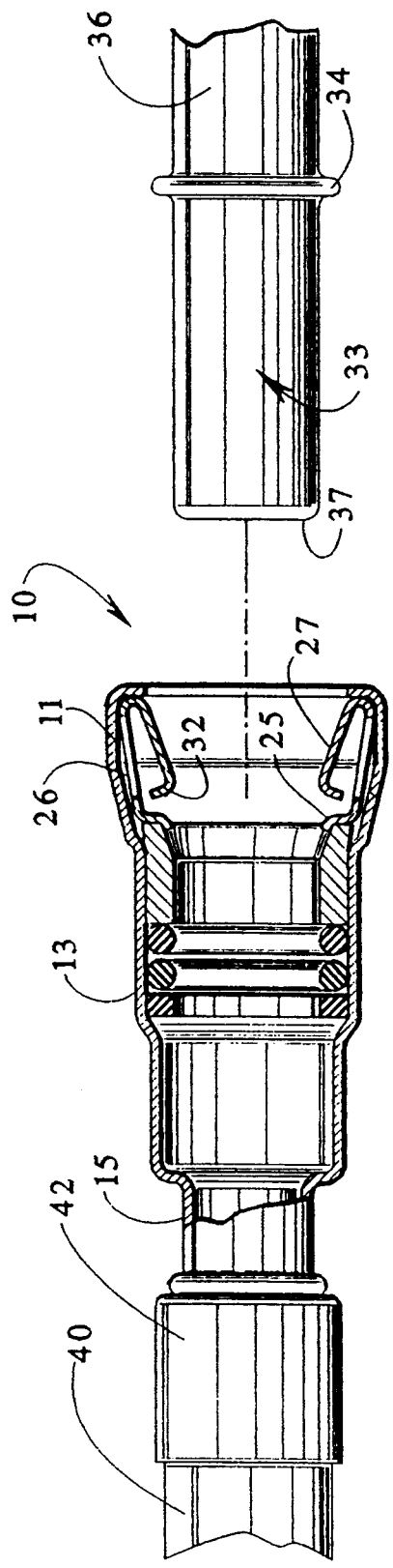
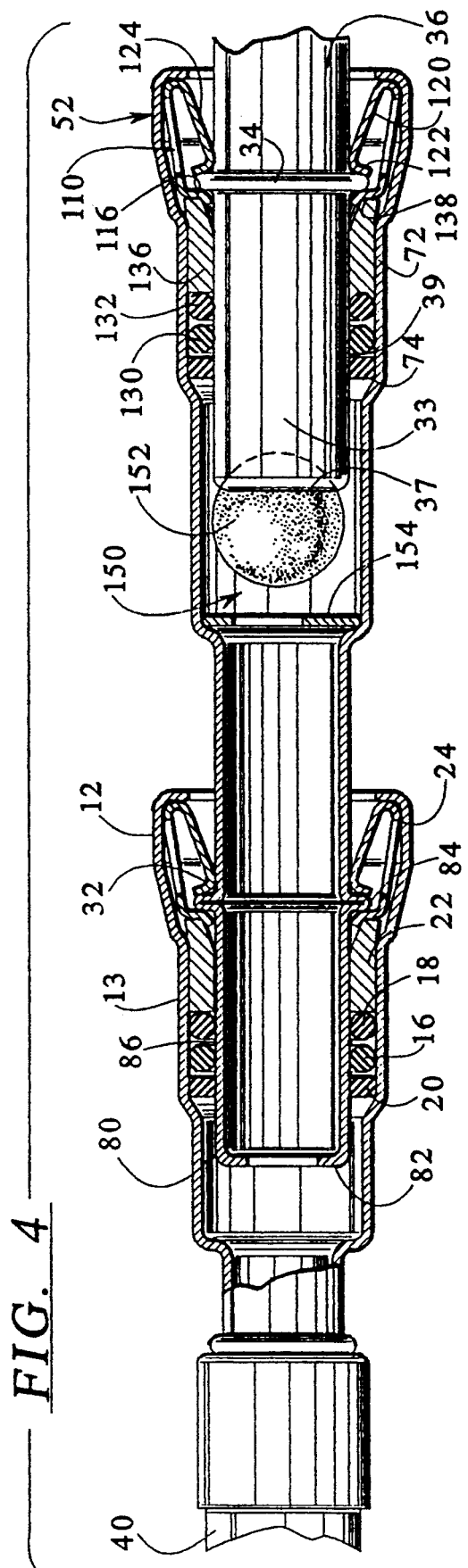
FIG. 3
FIG. 4

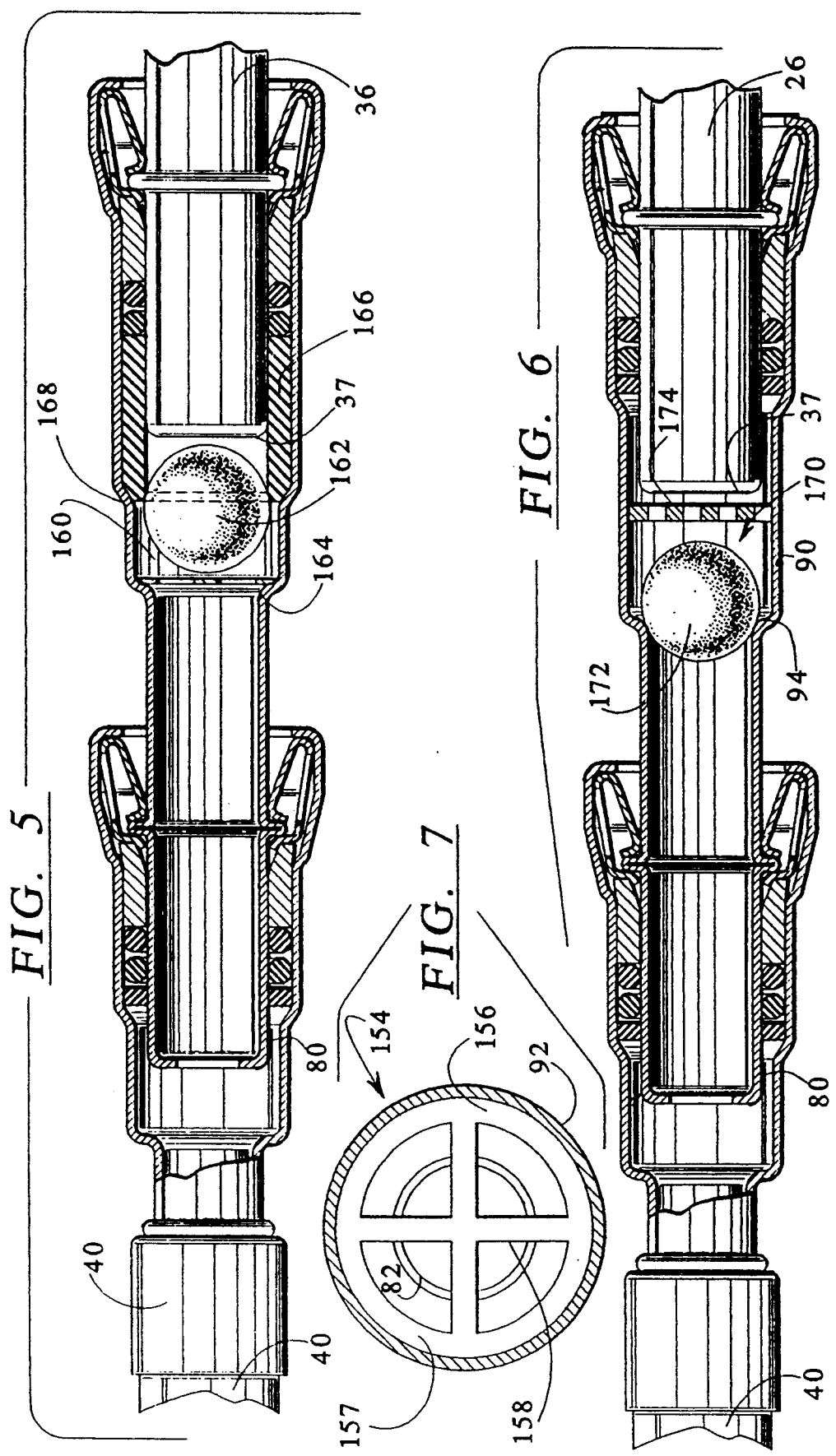

FLUID LINE ADAPTER

This application is a continuation-in-part of U.S. patent application 07/834,030, filed Feb. 11, 1992.

BACKGROUND OF THE INVENTION

This invention relates to fluid line systems which include quick connector couplings and more particularly to an adapter which may be used to add a functional element to an existing fluid line system.

In automotive and other fields, quick connector couplings are often utilized to provide a fluid connection between two components or conduits, thus establishing a fluid line between the two components, usually a rigid tube and a system element contained within a metal housing. Use of quick connector couplings is advantageous in that a sufficiently sealed and secured fluid line may be established with a minimum amount of time and expense.

Once a fluid line system has been established, it may later be desired to add functional elements. For example, it may be desired to add a check valve in order to permit flow through the line in one direction, but to prevent flow in the other direction. An appropriate location to add such a new element is an existing joint, particularly in instances where the joint is capable of disconnection and re-connection without sacrifice of system integrity. In a fluid line system utilizing quick connector couplings, this point corresponds to the location of quick connector coupling.

The prior art does not provide a device which facilitates easy addition of a functional element to an existing fluid line system at the site of a quick connector coupling. Known connective devices have been designed primarily to establish an initial fluid connection between two system components. Though one end forms a component of a connector coupling, the other end is connectable only to flexible tubing, a threaded bore, or some other form of connective element. To insert a functional element using known devices would require use of plural couplings and additional tubing and would add significant expense. This is a significant drawback, because fluid lines often exist in environments in which space available is extremely limited.

A clear need exists for a unitary device which may house a functional element and which is directly insertable into a fluid line system at a quick connect coupling joint. The adapter of the present invention meets this need.

SUMMARY OF THE INVENTION

The present invention provides a unitary adapter which is easily insertable into an existing fluid line system at a quick connect coupling joint. The adapter includes a female section and a male section. The female section of the adapter defines the retainer housing and seal housing portions of a female quick connector body suitable for use in the fluid line system. The male section defines the upset and seal surface portions of a male member suitable for use in the fluid line system. The female section connects to a male member of the existing fluid line system. The male section connects to the female connector body of the existing system.

The adapter may further include a middle section disposed between the male and female sections which is adapted to house a functional element to be added to the fluid line system. One such element which may be added is a check valve which allows flow in only one direction through the fluid line. Numerous others are envisioned.

BRIEF DESCRIPTION OF THE DRAWINGS

FIG. 1 is a partial sectional view of a quick connector coupling forming a joint in an existing fluid line system;

FIG. 2 is a sectional view of an adapter which embodies the present invention;

FIG. 3 is a partial sectional view of the connector coupling of FIG. 1 in a disconnected condition;

FIG. 4 is a partial sectional view of the adapter of FIG. 2 installed in the quick connector coupling depicted in FIG. 1;

FIG. 5 is a partial sectional view of a second embodiment of the present invention; and FIG. 6 is a partial sectional view of a third embodiment of the present invention.

FIG. 7 is a sectional view of FIG. 2 taken along line 1—1;

DETAILED DESCRIPTION OF THE ILLUSTRATED EMBODIMENTS

A quick connector coupling 10 of an existing fluid line system is illustrated in FIG. 1. A detailed description of a similar coupling is found in U.S. Pat. No. 4,846,506.

Quick connector coupling 10 is comprised of a female connector body 12 and a male member 33 formed at an end of a tube 36 which forms a part of the fluid system. Female connector body 12 is, in turn, connected to flexible tubing 40 which is also a component of the fluid line system. Female connector body 12 and male member 33 are connectable to form a permanent, but severable, joint.

Female connector body 12 is hollow and defines bore 14. It includes an enlarged retainer housing portion 11 at an end having an entrance 29 defined by radial annular rim 30. Body 12 also defines a cylindrical seal housing portion 13 and a tubing connection portion 15 at an end remote from retainer housing portion 11. Male member 33 includes an enlarged upset 34 formed a given distance from tube end 37. A cylindrical seal surface portion 39 extends from tube end 37 to upset 34.

Tubing connector portion 15 includes an exterior configuration adapted to connect to tubing 40. In the illustrated embodiment tubing 40 is held in fluid tight sealing relation to the exterior of tubing connector portion 15 by sleeve 42. Connector portion 15 could be configured in alternative ways for connection to other system arrangements. For example, threads could be formed in its outer periphery to facilitate connection within a threaded bore of a housing containing a system component.

Seals in the form of O-rings 16 and 18 are disposed in seal housing portion 13. The O-rings are held in place by spacers 20 and 22.

A retainer 24 is disposed in retainer housing portion 11. It includes an annular ring 25 which surrounds cylindrical surface portion 39 of male member 33 adjacent a radial surface of upset 34 facing tube end 37. Extending from ring 25 are a plurality of arms 26 defining bends 28 which abut annular rim 30 of retainer housing portion 11. Fingers 27 extend from bends 28 back towards annular ring 25 and terminate in edges 32. Finger edges 32 contact a radial surface of upset 34 facing connector body entrance 29 to secure male member 33 within female connector body 12.

When male member 33 is inserted in female connector body 12, O-rings 16 and 18 seal against cylindrical seal housing portion 13 of body 12 and also seal against cylindrical seal surface 39 of member 33. Male member 33 cannot be withdrawn from female connector body 12 because of the engagement of finger edges 32 with upset 34 and the engagement of arm bends 28 with radial annular rim 30. When so connected, quick connector coupling 10 provides a closed fluid communication between one component, represented by flexible tube 40, and another component, represented by tube 36.

An adapter embodying the principles of the present invention and suitable for use with the above-described coupling is illustrated in FIG. 2. Designated 50, the adapter is an integral, generally tubular member. Adapter 50 is hollow and defines a through bore 54. It includes a female section 52, a male section 80, and a middle section 90. Adapter 50 may be made of metallic materials, such as stainless steel, or, depending on its application, of suitable plastic materials.

Female section 52 defines an enlarged retainer housing portion 56 at an end of adapter 50 having an entrance 58 defined by a radial annular rim 60. Retainer housing portion 56 includes a first cylindrical wall 62 continuous with and extending away from annular rim 60. It further includes a frustro-conical wall 64 continuous with first cylindrical wall 62 at its end of largest diameter. A first shoulder 66 is formed at the smallest diameter end of wall 64.

Female section 52 further defines seal housing portion 70. Seal housing portion 70 includes a second cylindrical wall 72 continuous with first shoulder 66 of retainer housing portion 56. It further includes a second shoulder 74.

Male section 80 is formed at an end of adapter 50 remote from female section 52. It includes an open end 82, an enlarged upset 84 formed a given distance from end 82, and a cylindrical sealing surface 86 extending between end 82 and upset 84. A third cylindrical wall 88 of substantially the same diameter as sealing surface 86 extends away from a radial surface of upset 84 facing female section 52.

Female section 52 and male section 80 of adapter 50 are configured as described above in order to facilitate insertion adapter 50 into a particular quick connector coupling. Here, the particular coupling is coupling 10 illustrated in FIG. 1. Thus, female section 52 substantially matches the female connector body 12 of coupling 10 (with the omission of tubing connecting portion 15), and male section 80 substantially matches male member 33 of coupling 10. Alteration of the male and female sections of adapter 50 to fit into quick connect couplings of alternate designs is within the scope of this invention. Male section 52 would simply be designed to match the male member of the alternate quick connector, and female section 80 would be designed to match the female connector body of the alternate quick connector.

Middle section 90 is formed between female section 52 and male section 80. It defines a fourth cylindrical wall portion 92 extending away from second shoulder 74 of female section 52, and a third shoulder 94 continuous with third cylindrical wall 88 of male section 80.

Middle section 90 is shaped in this manner in order to accomodate a check valve 150 (to be described herein) to be added to the fluid line. It is envisioned that numerous other elements could be added to the fluid line. Examples of other functional elements which could be added include a "tee" connection or a fluid line sensor. This list is not intended to be inclusive. The configuration of middle section 90 is dictated by the particular element to be added. Generally, middle section 90 should be shaped so as to add as little length and complexity to the fluid line system as possible.

Disposed within seal housing portion 70 of female section 52 are O-ring seals 130 and 132. Two O-rings are shown, and preferred, but one O-ring would be sufficient. O-rings 130 and 132 are secured in seal housing portion 70 between hollow, cylindrical spacers 134 and 136. Spacer 134 is seated adjacent O-ring 130 and abuts second shoulder 74 of seal housing portion 70. Spacer 136 is seated adjacent O-ring 132, with a conically enlarged portion abutting first shoulder 66 of retainer housing portion 56. Annular edge 138 of spacer 136 faces entrance 58 to female section 52. Spacers 134 and 136 may be made of either metal or plastic.

A retainer 110 is disposed within retainer housing portion 56 of female section 52. Retainer 110 may be made of metal or, depending on its application, plastic. Suitable retainers are described in U.S. Pat. No. 4,846,506 (metal), U.S. Pat. No. 5,161,832 (plastic), and in copending application Ser. No. 07/766,619 (metal).

Retainer 110 includes an annular ring 116 which is seated against edge 138 of spacer 136. A plurality of circumferentially spaced arms 112 extend away from annular ring 116. Two arms 112 are shown, but more arms may be utilized where increased retention ability is desired. Arms 112 include bends 118 which abut radial annular rim 60 of female section 52. Fingers 120 extend away from bends 118 towards annular ring 116 and terminate in edges 122. Bumps 124 may be formed on fingers 120 in order to provide greater resistance to insertion of a male quick connector member.

A check valve 150 is disposed within middle section 90. It includes a ball 152 and a ball stop 154. In the illustrated embodiments, ball 152 is free-floating. However, as will be described, ball 152 could also be spring-loaded. Ball stop 154 may take the form of a hollow disk 156 bisected by cross hairs 157 and 158 (FIG. 7). Stop 154 may be configured differently, so long as axial movement of ball 152 is impeded while fluid flow through bore 54 is substantially unhindered. Ball 152 may be made of rubber, plastic or metal; ball stop 154 may be made of metal or plastic.

Adapter 50 is assembled by first installing check valve 150 in middle section 90. This consists of seating ball stop 154 against shoulder 94 and then dropping ball 152 into adapter 50 through entrance 58. In the check valve embodiment 170 illustrated in FIG. 6, these steps are reversed. Ball 172 must be inserted before ball stop 174 is seated. Next, the sealing elements are inserted into seal housing portion 70. Spacer 134 is seated against shoulder 74; O-rings 130 and 132 are placed against spacer 134; and spacer 136 is seated against shoulder 66 of retainer housing portion 56.

Finally, retainer 110 is inserted into retainer portion 56. Arms 112 are biased inwardly until bends 118 pass annular rim 60 of female section 52, at which time arms 112 flex outwardly to a relaxed position. In the relaxed position, bends 118 abut rim 60 to secure retainer 110 within retainer housing portion 56, and annular ring 116 abuts edge 138 of spacer 136 to secure the sealing elements and check valve ball 152.

In order to insert adapter 50 into an existing fluid line, the quick connect coupling joint 10 (FIG. 1) must first be disconnected. Male member 33 is withdrawn from female connector body 12 a distance sufficient to allow adapter 50 to be interposed. This distance may vary depending on the length of middle section 90. In order to withdraw male member 33, a suitable tool is used to flex retainer arms 26 outwardly, allowing upset 34 to clear finger edges 32. A quick connect coupling 10 disconnected in the above-described manner is illustrated in FIG. 3.

To insert adapter 50 in the disconnected coupling, adapter 50 is oriented with its male section 80 adjacent female connector body 12, and female section 52 adjacent male member 33. Male section 80 of adapter 50 is then inserted into female connector body 12. It is in a fully inserted positioned when the radial surface of upset 84 facing female section 52 is engaged by finger edges 32 of retainer 24, thus retaining male section 80 in female connector body 12. In this fully inserted position, O-rings 16 and 18 form a fluid seal between cylindrical sealing surface 86 of male section 80 and seal housing portion 13 of female connector body 12. Annular ring 25 of retainer 24 is secured between spacer 22 and a radial surface of upset 84 facing end 82 of male section 80.

To complete the connection, male member 33 is inserted into female section 52 of adapter 50. This is essentially a repeat of the method by which male section 80 was inserted into female connector body 12. Retainer fingers 120, and particularly bumps 124 formed on fingers 120, will resist insertion of male member 33. Once this resistance is overcome, momentum will carry male member 33 to the fully inserted position shown in FIG. 4. Finger edges 122 of retainer 110 engage a radial surface of upset 34 opposite from tube end 37, and O-rings 130 and 132 form a fluid seal between cylindrical seal surface portion 39 of male member 33 and second cylindrical wall 72 of adapter 50. Annular ring 116 of retainer 110 is secured between edge 138 of spacer 136 and a radial face of upset 34 facing tube end 37.

Once adapter 50 is installed in the fluid line at quick connector coupling joint 10, check valve 150 functions to permit flow in one direction only through the fluid line. FIGS. 4-6 illustrate three different check valve embodiments. In FIG. 4, flow is allowed in a right-to-left direction only, i.e., from tube 36 towards flexible tubing 40. Flow is blocked in the opposite (left-to-right) direction as pressure created by back flow from tube 40 towards tube 36 seats ball 152 against tube end 37, blocking the flow path. In FIG. 4, ball 152 is shown seated against tube end 37. Right-to-left flow is permitted as ball 152 is unseated by fluid flowing out of tube end 37 and pushed against stop 154. Fluid is free to flow around ball 152, past stop 154, and towards tubing 40.

The check valve 160 of FIG. 5 is a slightly modified version of the check valve 150 of FIG. 4 that functions to check flow in the same direction. An extended cylindrical spacer 166 is substituted for spacer 134. Spacer 166 extends past tube end 37 and provides a seat for ball 162, blocking flow in a left-to-right direction, i.e., from tubing 40 towards tube 36. Flow in a right-to-left direction is permitted as ball 162 is dislodged from its seat against spacer 166 and is pushed against ball stop 164. Fluid then passes around ball 162 and through stop 164. As can be seen in FIG. 5, stop 164 is moved closer to male section 80, as compared to stop 154 of of FIG. 4, in order to accomodate the lengthened spacer 166. Furthermore, a new shoulder 168 closer to male section 80 is formed in place of shoulder 74 to provide a seat for lengthened spacer 166.

The check valve configuration 170 of FIG. 6 operates to allow flow in a left-to-right direction, from flexible tubing 40 towards tube 36. Ball stop 174 is located between ball 172 and tube end 37. Thus, flow is blocked in the right-to-left direction as pressure created by flow from tube 36 towards tube 40 seats ball 172 against shoulder 94 of middle section 90, blocking the flow path. Left-to-right flow occurs as ball 172 is unseated from shoulder 86 and is pushed against stop 174 by fluid flowing through male bore 94 towards tube 36. Fluid flows around ball 172, past stop 174, and into tube 36.

The above-described check valve configurations may be spring loaded to enhance flow checking capability. In FIG. 4, a spring (not shown) seated against stop 154 would further bias ball 152 against tube end 37, ensuring that flow is blocked from tube 40 towards tube 36. Flow in the opposite direction would occur when the flow rate overcomes the spring force and unseats ball 152 from tube end 37. In FIG. 5, a spring would be similarly situated against stop 164, with ball 162 biased against extended inner spacer 166. To spring load check valve 170 of FIG. 6, a spring would be seated against stop 174, biasing ball 172 against shoulder 94.

Various features of the present invention have been explained with reference to the embodiments shown and described. It must be understood, however, that modification may be made without departing from the spirit and scope of the invention.

We claim:

1. An adapter for insertion into an existing fluid line system at a quick connector coupling joint, said quick connector coupling joint including a female connector body defining a retainer housing portion and a seal housing portion, a retainer being disposed in said retainer housing portion and at least one seal being disposed in said seal housing portion, and a male member defining an upset portion and a seal surface, said adapter comprising:

an integral body defining a through bore;
   a female section at one end of said adapter body defining said retainer housing portion and said seal housing portion of said female connector body of said quick connector coupling joint; and
   a male section at an end of said adapter body remote from said female section defining said upset portion and said seal surface of said male member of said quick connector coupling joint, said male section upset portion being spaced from said end of said adapter body remote from said female section a distance such that upon insertion of said adapter into said quick connector coupling joint, said retainer of said quick connector coupling joint engages said upset portion of said adapter body, and said at least one seal of said quick connector coupling joint contacts said seal surface of said adapter body.

2. An adapter as recited in claim 1 further comprising a middle section disposed between said female section and said male section, said middle section being adapted to receive a functional element to be added to said existing fluid line system.

3. An adapter as recited in claim 2 wherein a check valve is disposed in said middle section.

4. An adapter as recited in claim 3 wherein said check valve includes a ball disposed within said middle section, and a ball stop which restricts movement of said ball within said middle section.

5. An adapter as recited in claim 4 wherein said middle section includes a shoulder positioned at an end of said middle section adjacent said male section.

6. An adapter as recited in claim 5 wherein said ball stop is seated against said shoulder, and said ball is positioned between said ball stop and said female section.

7. An adapter as recited in claim 5 wherein said ball is positioned adjacent said shoulder, and said ball stop is positioned between said ball and said female section.

8. A fluid line adapter comprising:
an integral body extending between first and second ends, said body defining a bore;
a female section adjacent said first end of said body, said female section defining a retainer housing portion and a seal housing portion, a retainer being disposed in said retainer housing portion and at least one seal being disposed in said seal housing portion said retainer housing portion including an annular rim defining an entrance to said bore; a first cylindrical wall extending from said annular rim, a frustro-conical wall extending from said first cylindrical wall, and a first shoulder extending from said frustro-conical wall, said seal housing portion including a second cylindrical wall extending from said first shoulder, and a second shoulder extending from said second cylindrical wall; and
a male section adjacent said second end of said body, said male section defining an upset formed a given distance from said second end, a cylindrical sealing surface extending between said second end and said upset, said distance between said upset and said second end being such that if said male section were inserted into said female section, said upset would engage said retainer and said sealing surface would contact said at least one seal, and a third cylindrical wall extending from said upset towards said female section, said third cylindrical wall having a diameter substantially equal to that of said sealing surface.

9. An adapter as recited in claim 8 wherein said seal housing portion of said female section includes a first spacer seated adjacent said first shoulder, a second spacer seated adjacent said second shoulder, and two O-ring seals disposed between said first and second spacers.

10. An adapter as recited in claim 9 wherein said retainer includes an annular ring seated against said first spacer, a plurality of circumferentially spaced arms extending away from said annular ring and including bends which abut said annular rim, and fingers extending away from said bends towards said annular ring.

11. An adapter as recited in claim 8 and further comprising a middle section positioned between said female section and said male section, said middle section including a fourth cylindrical wall extending from said second shoulder of said seal housing portion of said female section, and a third shoulder extending from said fourth cylindrical wall.

12. An adapter as recited in claim 11 wherein a check valve is disposed in said middle section.

13. An adapter as recited in claim 12 wherein said check valve includes a ball disposed in said middle section, and a ball stop which restricts movement of said ball within said middle section.

14. A method of inserting an adapter into an existing fluid line system at a quick connector coupling joint, said quick connector coupling joint including a male member received by a female connector retainer and at least one seal being disposed in said female connector body, said method comprising the following steps:
(1) forming a female section at one end of said adapter adapted to connect to said male member of said quick connector coupling joint;
(2) forming a male section at an end of said adapter remote from said female section adapted to connect to said female connector body of said quick connector coupling joint, said male section including an upset portion spaced from said end of said adapter, a cylindrical sealing surface being defined between said upset and said end of said adapter, said upset being spaced from said end of said adapter a distance such that when inserted into said quick connector coupling joint, said upset engages said retainer and said cylindrical sealing surface contacts said at least one seal;
(3) disconnecting said quick connector coupling joint by withdrawing said male member from said female connector body;
(4) connecting said male section of said adapter to said female connector body of said quick connector coupling joint; and
(5) connecting said female section of said adapter to said male member of said quick connector coupling joint.

15. The method of claim 14 comprising the additional step of forming a middle section between said male and female sections.

16. The method of claim 15 comprising the additional step of disposing a check valve in said middle section.

17. An adapter for insertion into an existing fluid line system at a quick connector coupling joint, said quick connector coupling joint including a male member connected to a female connector body, a retainer and at least one seal being disposed in said female connector body, said adapter comprising:
a female section adapted to connect to said male member of said quick connect coupling joint; and
a male section adapted to connect to said female connector body of said quick connect coupling joint, said male section including an upset portion spaced from an end of said adapter remote from said female section, a cylindrical sealing surface being defined between said upset and said end, said upset being spaced from said end of said adapter a distance such that when inserted into said quick connector coupling joint, said upset engages said retainer and said cylindrical sealing surface contacts said at least one seal.

18. An adapter as recited in claim 17 further comprising a middle section containing a check valve.

19. A modified quick connector coupling joint forming a fluid line between first and second fluid system components, said joint comprising:
a female connector body defining a bore, said female connector body including a tubing connector portion at one end, said tubing connecting portion being attached to said first fluid system component, a seal housing portion, sealing means disposed in said seal housing portion, a retainer housing portion at an end of said body remote from said tubing connector portion, and retention means disposed within said retainer housing portion for engaging an upset of an inserted tubular member;
an adapter connected to said female connector body, said adapter defining a bore and including a male section at one end and a female section at an end remote from said male section, said male section including an upset engaged by said retention means disposed in said retainer housing portion of said female connector body, and a seal surface in sealing contact with said sealing means disposed in said seal housing portion of said female connector body, said female section including a seal housing portion, sealing means disposed in said seal housing portion, a retainer housing portion, and retention means disposed within said retainer housing portion for engaging an upset of an inserted tubular member; and a male member connected to said female section of said adapter, said male member defining a bore and being formed at an end of a tube connected to said second fluid system component, said male member including an upset and a seal surface, said upset being engaged by said retention means disposed in said retainer housing portion of said female section of said adapter, and said seal surface being in sealing contact with said sealing means disposed in said seal housing portion of said female section of said adapter.

20. A modified quick connector coupling joint as recited in claim 19 wherein said adapter further comprises a middle section containing check valve means for allowing flow in only one direction through said modified quick connector coupling joint.

21. A modified quick connector coupling joint as recited in claim 20 wherein said middle section includes a shoulder, and said check valve means includes a ball disposed in said middle section and a ball stop to limit movement of said ball in said middle section.

22. A modified quick connector coupling joint as recited in claim 21 wherein said ball stop is seated adjacent said shoulder, said ball seating against an open end of said male member to block flow in a direction from said first system component to said second system component, and said ball abutting said ball stop to permit flow in a direction from said second system component to said first system component.

23. A modified quick connector coupling joint as recited in claim 21 wherein a cylindrical spacer is disposed in said middle section, and said ball stop is seated adjacent said shoulder, said ball seating against an end of said spacer to block flow in a direction from said first fluid system component to said second fluid system component, and said ball abutting said ball stop to permit flow in a direction from said second fluid system component to said first fluid system component.

24. A modified quick connector coupling joint as recited in claim 21, wherein said ball is disposed in said middle section adjacent said shoulder, and said ball stop is seated between said ball and an end of said male member, said ball seating against said shoulder to block flow in a direction from said second fluid system component to said first fluid system component, and said ball abutting said ball stop to permit in a direction from said first fluid system component to said second fluid system component.

25. A modified quick connector coupling joint as recited in claim 20 wherein said middle section includes a shoulder, and said check valve means includes a stopper disposed in said middle section and means to limit movement of said stopper in said middle section.

26. A modified quick connector coupling joint as recited in claim 25 wherein a stopper seat is disposed in said middle section, and said stopper movement-limiting means is seated adjacent said shoulder, said stopper seating against said stopper seat to block flow in a direction from said first system component to said second fluid system component, and said stopper moving against said stopper-movement limiting means to permit flow in a direction from said second fluid system component to said first fluid system component.

27. A modified quick connector coupling joint recited in claim 26 wherein said stopper-movement limiting includes a spring.

* * * * *